(12) United States Patent
Ozaki et al.

(10) Patent No.: US 8,836,787 B2
(45) Date of Patent: Sep. 16, 2014

(54) IMAGE GENERATING APPARATUS AND IMAGE DISPLAY SYSTEM

(75) Inventors: Yukisuke Ozaki, Kobe (JP); Yasuhiro Ohno, Kobe (JP)

(73) Assignee: Fujitsu Ten Limited, Kobe-shi (JP)

( * ) Notice: Subject to any disclaimer, the term of this patent is extended or adjusted under 35 U.S.C. 154(b) by 379 days.

(21) Appl. No.: 13/381,258

(22) PCT Filed: Jun. 8, 2010

(86) PCT No.: PCT/JP2010/059692
§ 371 (c)(1),
(2), (4) Date: Dec. 28, 2011

(87) PCT Pub. No.: WO2011/001794
PCT Pub. Date: Jan. 6, 2011

(65) Prior Publication Data
US 2012/0105643 A1    May 3, 2012

(30) Foreign Application Priority Data
Jul. 2, 2009   (JP) .................................. 2009-157368

(51) Int. Cl.
*H04N 7/18* (2006.01)
*G08G 1/16* (2006.01)
*B60R 1/00* (2006.01)

(52) U.S. Cl.
CPC ......... *G08G 1/168* (2013.01); *B60R 2300/8093* (2013.01); *B60R 2300/304* (2013.01); *B60R 2300/105* (2013.01); *B60R 2300/806* (2013.01); *B60R 1/00* (2013.01); *B60R 2300/602* (2013.01); *C08G 1/167* (2013.01)
USPC ....................................................... 348/148

(58) Field of Classification Search
CPC ...................................................... H04N 7/18

USPC .......................................... 348/148, 158, 159
See application file for complete search history.

(56) References Cited

U.S. PATENT DOCUMENTS 6,476,731 B1 * 11/2002 Miki et al. ..................... 340/937
6,476,855 B1 * 11/2002 Yamamoto .................... 348/148
(Continued)

FOREIGN PATENT DOCUMENTS

JP    A-2001-055100    2/2001
JP    A-2001-339715    12/2001
(Continued)

OTHER PUBLICATIONS

Watanabe et al, machine generated translation of JP2007-288611, Nov. 2007.*
(Continued)

*Primary Examiner* — David Harvey
(74) *Attorney, Agent, or Firm* — Oliff PLC

(57) ABSTRACT

When displaying a peripheral image in the case where a traveling speed of a vehicle is lower than a predetermined threshold value, it is possible to provide a user with a state of a necessary area of the vehicle without switching a display mode. In an image display system, when the traveling speed of the vehicle drops to below a predetermined threshold value such that an operation mode shifts into a front mode, the display mode becomes a front/side mode that simultaneously displays both a front area and a side area of the vehicle at the time that the front mode is started. A screen presented in the front/side mode can respond to various circumstances such as approaching an intersection, passing by another vehicle, and moving a vehicle toward a roadside. Accordingly, a user can monitor a state of a necessary area around the vehicle, without switching the display mode.

10 Claims, 14 Drawing Sheets

(56) References Cited

U.S. PATENT DOCUMENTS

| | | | |
|---|---|---|---|
| 7,253,833 B2 * | 8/2007 | Imoto | 348/148 |
| 7,640,107 B2 * | 12/2009 | Shimizu et al. | 701/523 |
| 7,898,434 B2 * | 3/2011 | Taniguchi et al. | 340/937 |
| 8,130,269 B2 * | 3/2012 | Mori et al. | 348/148 |
| 8,319,617 B2 * | 11/2012 | Ohshima et al. | 340/435 |
| 8,340,870 B2 * | 12/2012 | Ohshima et al. | 701/42 |
| 8,553,081 B2 * | 10/2013 | Abe | 348/118 |
| 2002/0034316 A1 * | 3/2002 | Ishii et al. | 382/104 |
| 2008/0012940 A1 * | 1/2008 | Kanaoka et al. | 348/148 |
| 2009/0160940 A1 * | 6/2009 | Imamura | 348/159 |

FOREIGN PATENT DOCUMENTS

| | | | |
|---|---|---|---|
| JP | B2-3300334 | | 7/2002 |
| JP | A-2003-078907 | | 3/2003 |
| JP | A-2006-270586 | | 10/2006 |
| JP | A-2007-022176 | | 2/2007 |
| JP | 2007237785 A | * | 9/2007 |
| JP | 02007288611 A | * | 11/2007 |
| JP | A-2008-247239 | | 10/2008 |

OTHER PUBLICATIONS

Haraikawa et al, Machine generated translation of JP2007237785A, Sep. 2007.*

International Search Report in International Application No. PCT/JP2010/059692; dated Sep. 21, 2010 (with English-language translation).

Jul. 2, 2013 Office Action issued in Japanese Patent Application No. 2012-195991 (with translation).

Korean Office Action issued in Korean Patent Application No. 10-2011-7031230 dated May 1, 2013 (w/translation).

Dec. 20, 2013 Chinese Office Action issued in Chinese Application No. 201080029901.3 (with translation).

* cited by examiner

IMAGE GENERATING APPARATUS AND IMAGE DISPLAY SYSTEM

TECHNICAL FIELD

The present invention relates to technology for generating an image to be displayed on a display apparatus mounted on a vehicle.

BACKGROUND ART

An image generating apparatus of a related art is mounted on a vehicle such as a car, and generates an image of periphery of the vehicle by means of vehicle mounting cameras. The image generated in the image generating apparatus is displayed on a display in the inside of the vehicle. In this way, images of the vehicle periphery are provided to a driver almost in real time.

For example, an outside area of a front fender, which is opposite to a driver's seat, is easily blinded. As such, an image showing the outside area of the front fender is generated by image capturing in vehicle mounting cameras, and displayed on a display in the inside of the vehicle. Accordingly, in case of moving a vehicle toward a roadside or other circumstances, a driver can easily monitor clearance between the vehicle body opposite to the driver's seat and an obstacle.

Patent Document 1 discloses an apparatus for generating a synthetic image showing the periphery of the vehicle viewed from a virtual viewpoint directly above or rear the vehicle, by using a plurality of captured images that are obtained by capturing images of the periphery of the vehicle by means of a plurality of vehicle mounting cameras, and providing the synthetic image to a driver.

RELATED ART

Patent Document

Patent Document 1: Japanese Patent Publication No. 3300334

DISCLOSURE OF THE INVENTION

Technical Problems to be Solved by the Invention

In most cases of performing driving operation, which especially requires monitoring the vehicle periphery, such as approaching an intersection, passing near another vehicle, and moving a vehicle toward a roadside, a driver reduces a traveling speed of the vehicle. If the traveling speed of the vehicle drops to below a predetermined threshold value, the driver needs to monitor the periphery of the vehicle. Accordingly, it is considered that a peripheral image showing the periphery of the vehicle is automatically displayed on a display in the inside of the vehicle.

However, vehicle peripheral areas that need to be especially monitored by the driver are different depending on the circumstances that the driver reduces the traveling speed of the vehicle. For example, when approaching an intersection, the driver needs to especially monitor a front area of the vehicle. When passing near another vehicle or moving the vehicle toward a roadside, the driver needs to especially monitor a side area of the vehicle.

Accordingly, when the traveling speed of the vehicle drops to below a predetermined threshold value, if a display mode is unconditionally switched to a display mode for displaying only the front or side area, a different area from the area that the driver wants to monitor may be displayed. For example, under the circumstance that the driver attempts to approach an intersection, the front area of the vehicle needs to be monitored. However, there may be a case where the display mode is automatically switched to a display mode for displaying the side area of the vehicle. In this case, the driver should switch the display mode to the display mode for displaying the front area. Altering the display mode under the circumstance that the vehicle periphery needs to be especially monitored may cause operation to be complicated and damage convenience.

The present invention has been made in consideration of the circumstances, and its object is to provide technology that provides a user with a state of a necessary area around a vehicle without switching a display mode, when displaying a peripheral image in the case where a traveling speed of the vehicle drops to below a predetermined threshold value.

Means to Solve the Problems

The object of the present invention is accomplished by the configuration set forth below.

(1) An image generating apparatus that generates an image to be displayed on a display apparatus mounted on a vehicle, the image generating apparatus comprising: an acquiring section that acquires a traveling speed of the vehicle; a display control section that makes the display apparatus display an image showing the periphery of the vehicle when the traveling speed is lower than a first threshold value; and a mode switching section that switches a display mode for making the display apparatus display the image to one display mode selected from among a plurality of display modes in response to a user operation, the display modes being different from each other, wherein the mode switching section switches the display mode to a specific display mode for making the display apparatus display an image including a first image showing a front area of the vehicle and a second image showing a side area of the vehicle which are juxtaposed to each other at the time the traveling speed drops to below the first threshold value and the display control section starts making the display apparatus display the image.

(2) The image generating apparatus as set forth in (1) above, further comprising a generating section that generates a synthetic image showing the vehicle and the periphery of the vehicle viewed from a virtual viewpoint based on a plurality of images of the periphery of the vehicle captured by a plurality of cameras, wherein the second image is the synthetic image generated by the generating section.

(3) The image generating apparatus as set forth in (2) above, further comprising an input section that inputs a direction indication of a driver of the vehicle, wherein the generating section generates, as the second image, a synthetic image in which one side area of the vehicle, which is indicated by the direction indication is displayed larger in size than another side area of the vehicle when the direction indication is input by the input section.

(4) The image generating apparatus as set forth in (3) above, wherein the synthetic image generating section generates, as the second image, a synthetic image in which the one side area of the vehicle, which is indicated by the direction indication is displayed larger in size than the another side area of the vehicle when the direction indication is input by the input section from the time the traveling speed drops to below the first threshold value and the display control section starts making the display apparatus display the image.

(5) The image generating apparatus as set forth in any one of (2) to (4) above, wherein the generating section generates the synthetic image at any time during the image generating apparatus is activated.

(6) The image generating apparatus as set forth in any one of (2) to (4) above, wherein the generating section generates the synthetic image only when making the display apparatus display the synthetic image.

(7) The image generating apparatus as set forth in any one of (2) to (4) above, wherein the generating section generates the synthetic image when the traveling speed drops to below a second threshold value which is higher than the first threshold value.

(8) The image generating apparatus as set forth in any one of (1) to (7) above, wherein the display modes except the specific display mode are display modes for making the display apparatus display an image showing only one of the front area of the vehicle and the side area of the vehicle.

(9) The image display system to be mounted on a vehicle, the image display system comprising: the image generating apparatus as set forth in any one of (2) to (8) above; and a display apparatus that displays an image generated by the image generating apparatus.

Effect of the Invention

According to the configuration set forth in (1) to (9) above, a specific display mode that simultaneously displays the front area and the side area of the vehicle and has high generality is displayed, at the time that the traveling speed drops to below the first threshold value, and the operation to make the display apparatus display a peripheral image is started. Accordingly, it is possible to provide a user with the state of the necessary area without switching the display mode.

According to the configuration set forth in (2) above, the second image is the synthetic image generated by the generating section, such that it is possible to provide an image of the periphery of the vehicle viewed from a certain virtual viewpoint. Accordingly, it is possible to provide information having higher generality.

According to the configuration set forth in (3) above, the side area in the direction intended by a driver where there is likely an object that may contact with the vehicle when the vehicle moves is largely displayed. Accordingly, the object that may contact with the vehicle is easily found out, so that a minor car crash accident can be effectively prevented.

According to the configuration set forth in (4) above, the side area in the direction intended by a driver is largely displayed from the time that the operation to display a peripheral image is started. Accordingly, the object that may contact with the vehicle can be quickly found out.

According to the configuration set forth in (5) above, the synthetic image is continuously generated during the time that the image generating apparatus is activated.

Accordingly, it is possible to display the synthetic image immediately when the traveling speed drops to below the first threshold value.

According to the configuration set forth in (6) above, the synthetic image is generated only when making the display apparatus display the synthetic image, so that power consumption can be reduced.

According to the configuration set forth in (7) above, generating the synthetic image is started at the time that the traveling speed drops to below the second threshold value, so that power consumption can be reduced, and the synthetic image can be quickly displayed when the traveling speed drops to below the first threshold value.

According to the configuration set forth in (8) above, it is possible to provide display modes suitable for various driving circumstances, in addition to a specific display mode having high generality.

BRIEF DESCRIPTIONS OF DRAWINGS

THE BEST MODE TO CARRY OUT THE INVENTION

Hereinafter, embodiments of the present invention will be described with reference to the accompanying drawings.

1. Embodiment 1

1-1. Configuration

Figure 1:
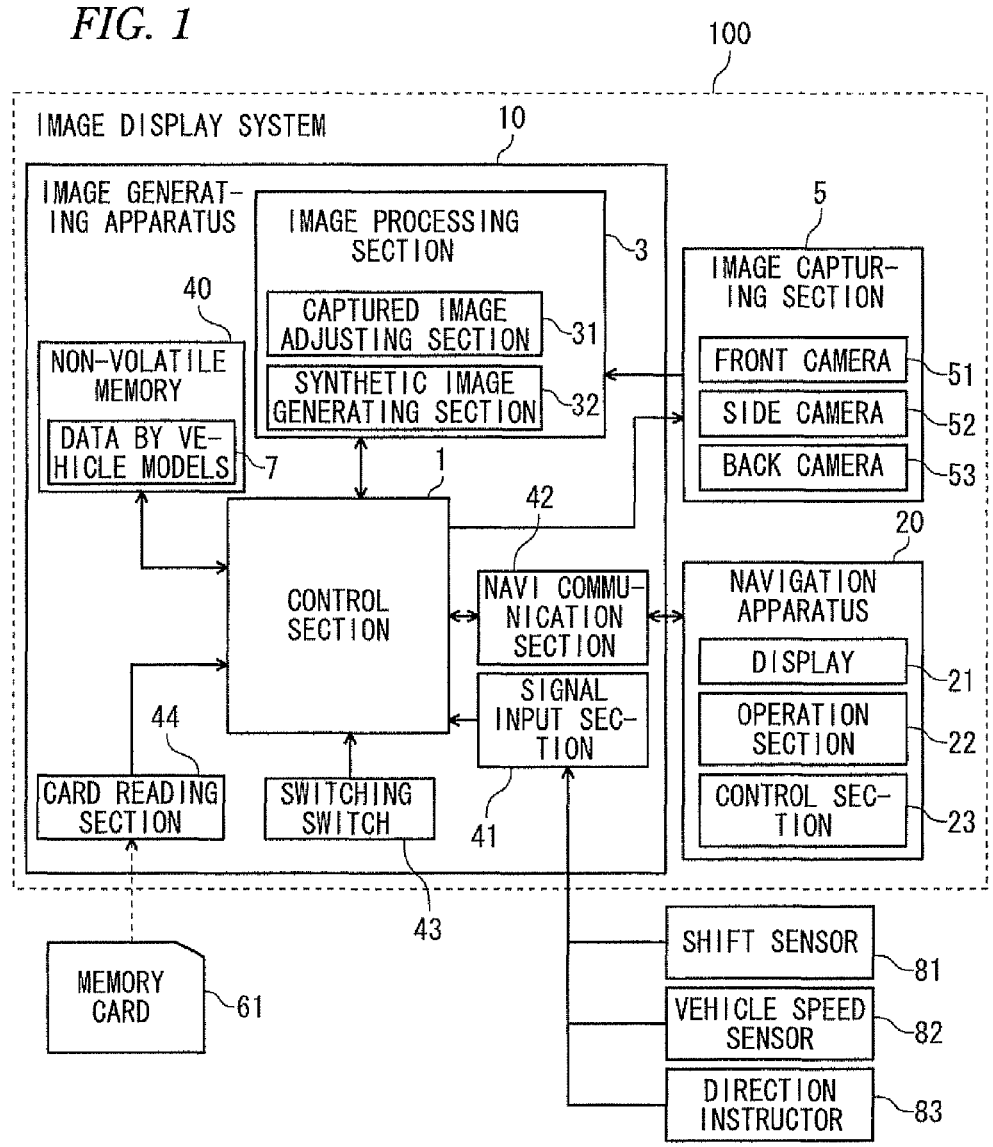
FIG. 1 is a block diagram showing configuration of an image display system.

FIG. 1 is a block diagram showing configuration of an image display system 100 of Embodiment 1. The image display system 100 is mounted on a vehicle (a car in Embodiment 1), and has functions of capturing an image of the periphery of the vehicle to generate a peripheral image and displaying the image in the inside of the vehicle. A user who uses the image display system 100 (a driver as a representative example) can easily monitor the periphery of the vehicle by using the image display system 100.

As illustrated in FIG. 1, the image display system 100 includes an image capturing section 5 that captures an image of the periphery of the vehicle, an image generating section 10 that generates a peripheral image showing the periphery of the vehicle, and a navigation apparatus 20 that provides a user who takes the vehicle with various information. The image generating apparatus 10 is configured by ECU (Electronic Control Unit) having an image generating function, and provided at a predetermined position of the vehicle.

The navigation apparatus 20 carries out navigation guide to a user. The navigation apparatus 20 includes a display 21 such as a crystal liquid having a touch panel function, an operation section 22 operated by a user, and a control section 23 that controls the apparatus as a whole. The navigation apparatus 20 is provided on an instrument panel of the vehicle, such that the screen of the display 21 can be seen from a user. Various instructions from a user are received by the operation section 22 and the display 21 as a touch panel. The control section 23 is configured by a computer equipped with CPU, RAM, ROM, and others. The CPU carries out calculation processing in accordance with predetermined programs such that various functions including the navigation function are executed.

The navigation apparatus 20 is communicatably connected to the image generating apparatus 10, and capable of transmitting and receiving various control signals with the image generating apparatus 10, or receiving a peripheral image generated in the image generating apparatus 10. In normal circumstances, the display 21 displays an image based on the function of the navigation apparatus 20 as a single unit, under control by the control section 12. However, under a predetermined condition, the display 21 displays a peripheral image generated in the image generating apparatus 10 to show the periphery of the vehicle. Accordingly, the navigation apparatus 20 functions also as a display apparatus that receives a peripheral image generated in the image generating apparatus 10 and displays the image.

The image capturing section 5 is electrically connected to the image generating apparatus 10 and operates based on a signal from the image generating apparatus 10. The image capturing section 5 includes vehicle mounting cameras, i.e., a front camera 51, side cameras 52, and a back camera 53. The vehicle mounting cameras 51, 52, and 53 include lenses and image capturing elements, and electronically acquire images.

Figure 2:
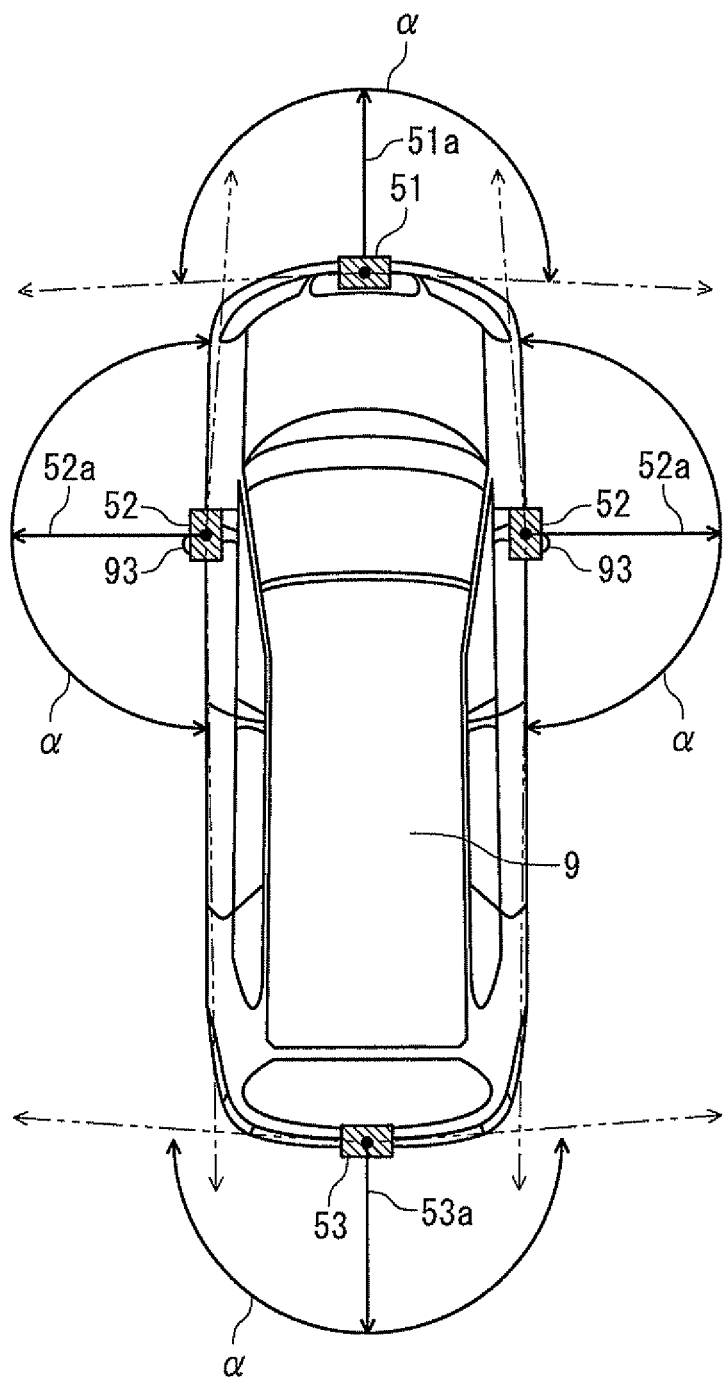
FIG. 2 is a view showing positions of vehicle mounting cameras on a vehicle.

FIG. 2 is a view showing positions of the vehicle mounting cameras 51, 52 and 53 on the vehicle 9. As illustrated in FIG. 2, the front camera 51 is provided near a position of a number plate at a front end of the vehicle 9. An optical axis 51a of the front camera 51 is directed toward a straight direction of the vehicle 9. The side cameras 52 are provided on left and right door mirrors 93, respectively. Optical axes 52a of the side cameras 52 are directed toward an outside direction of the vehicle 9 to be orthogonal to the straight direction. The back camera 53 is provided near a position of a number plate at a rear end of the vehicle 9. An optical axis 53a of the back camera 53 is directed toward a reverse direction of the straight direction of the vehicle 9. The front camera 51 or the back camera 53 is preferably provided at substantially a center of the left and the right, but may be positioned somewhat out of the center of the left and the right toward the left or right direction.

For the lenses of the vehicle mounting cameras 51, 52, and 53, fish-eye lenses or others are employed. The vehicle mounting cameras 51, 52, and 53 have at least 180° of an angle of view α. Accordingly, if the four vehicle mounting cameras 51, 52, and 53 are used, it is possible to capture an image of the entire circumference of the vehicle 9.

Returning to FIG. 1, the image generating apparatus 10 includes a control section 1 that controls the apparatus as a whole, an image processing section 3 that carries out processing a captured image that is acquired from the image capturing section 5 and generates a peripheral image for display, a navigation communication section 42 that communicates with the navigation apparatus 20, and a switching switch 43 that receives an instruction to switch a displayed content from a user.

Various instructions received from a user through the operating section 22 or the display 21 of the navigation apparatus 20 are received by the navigation communication section 42 as control signals and input into the control section 1. A signal presenting a user's instruction is also input from the switching switch 43 into the control section 1. Accordingly, the image generating apparatus 10 can carries out operation to respond to both the user's operation to the navigation apparatus 20 and the user's operation to the switching switch 43.

The image processing section 3 is configured by a hardware circuit capable of processing various images, and includes a captured image adjusting section 31 and a synthetic image generating section 32 as main functions. The captured image adjusting section 31 carries out adjustment of a captured image that has been acquired in the image capturing section 5. The captured image adjusting section 31 carries out adjustment of image quality of a captured image such as brightness or contrast, distortion correction to an image, or others. The synthetic image generating section 32 generates a synthetic image viewed from a certain virtual viewpoint around the vehicle 9, based on a plurality of captured images that have been acquired from the plurality of vehicle mounting cameras 51, 52, and 53 of the image capturing section 5. How the synthetic image generating section 32 generates a synthetic image viewed from a virtual viewpoint will be described hereafter. After a captured image or a synthetic image is adjusted to be an image for display, it is output to the navigation apparatus 20 by the navigation communication section 42. In this way, the display 21 of the navigation apparatus 20 displays a peripheral image showing the periphery of the vehicle.

The control section 1 is configured by a computer equipped with CPU, RAM, ROM, and others. The CPU carries out calculation processing in accordance with predetermined programs such that various control functions are executed. The functions of the control section 1 that are accomplished as described above include a function of controlling image processing that is carried out by the image processing section 3, and others. Various parameters needed to generate a synthetic image in the synthetic image generating section 32 are instructed by the function of the control section 1.

The image generating apparatus 10 further includes a non-volatile memory 40, a card reading section 44, and a signal input section 41, which are connected to the control section 1.

The non-volatile memory 40 is configured by a flash memory capable of maintaining stored contents even when power is off. The non-volatile memory 40 stores in advance various data needed to generate a synthetic image. For example, the non-volatile memory 40 stores in advance data 7 by vehicle models that can be applied in accordance with a vehicle model of the vehicle 9. The control section 1 controls reading or recording the data stored in the non-volatile memory 40.

The card reading section 44 reads a memory card 61, which is a transportable reading medium. The card reading section 44 has a card slot, into which the memory card 61 is inserted, and reads data recorded in the memory card 61 inserted into the card slot. The data read by the card reading section 44 are input into the control section 1.

The memory card 61 is configured by a flash memory capable of storing various data, and others. The image generating apparatus 10 may use various data stored in the memory card 61. For example, a program is stored in the memory card 61 and read, whereby a program (firmware) to accomplish the function of the control section 1 can be renewed. In addition, data 7 by vehicle models, which are different from the data 7 by vehicle models that are stored in the non-volatile memory 40, are stored in the memory card 61 and read to store the read data 7 in the non-volatile memory 40, so that the image display system 100 may be applied to different models of vehicles.

The signal input section 41 inputs signals from various apparatuses provided in the vehicle 9. Signals from the outside of the image display system 100 are input into the control section 1, through the signal input section 41. Specifically, signals presenting various information are input from a shift sensor 81, a vehicle speed sensor 82, a direction indicator 83, and others to the control section 1. From the shift sensor 81, an operation position of a shift lever in a transmission of the vehicle 9, i.e., a shift position such as "P (parking)," "D (driving)," "N (neutral)," or "R (reversing)" is input. From the vehicle speed sensor 82, a traveling speed (km/h) of the vehicle 9 at that time is input.

From the direction indicator 83, direction indication based on operation of a winker switch, i.e., a turn signal presenting direction indication intended by a driver of the vehicle 9 is input. When the winker switch is operated, a turn signal is generated. The turn signal presents the operated direction (left or right direction). When the winker switch is in a neutral position, the turn signal is off.

1-2. Image Conversion Processing

Figure 3:
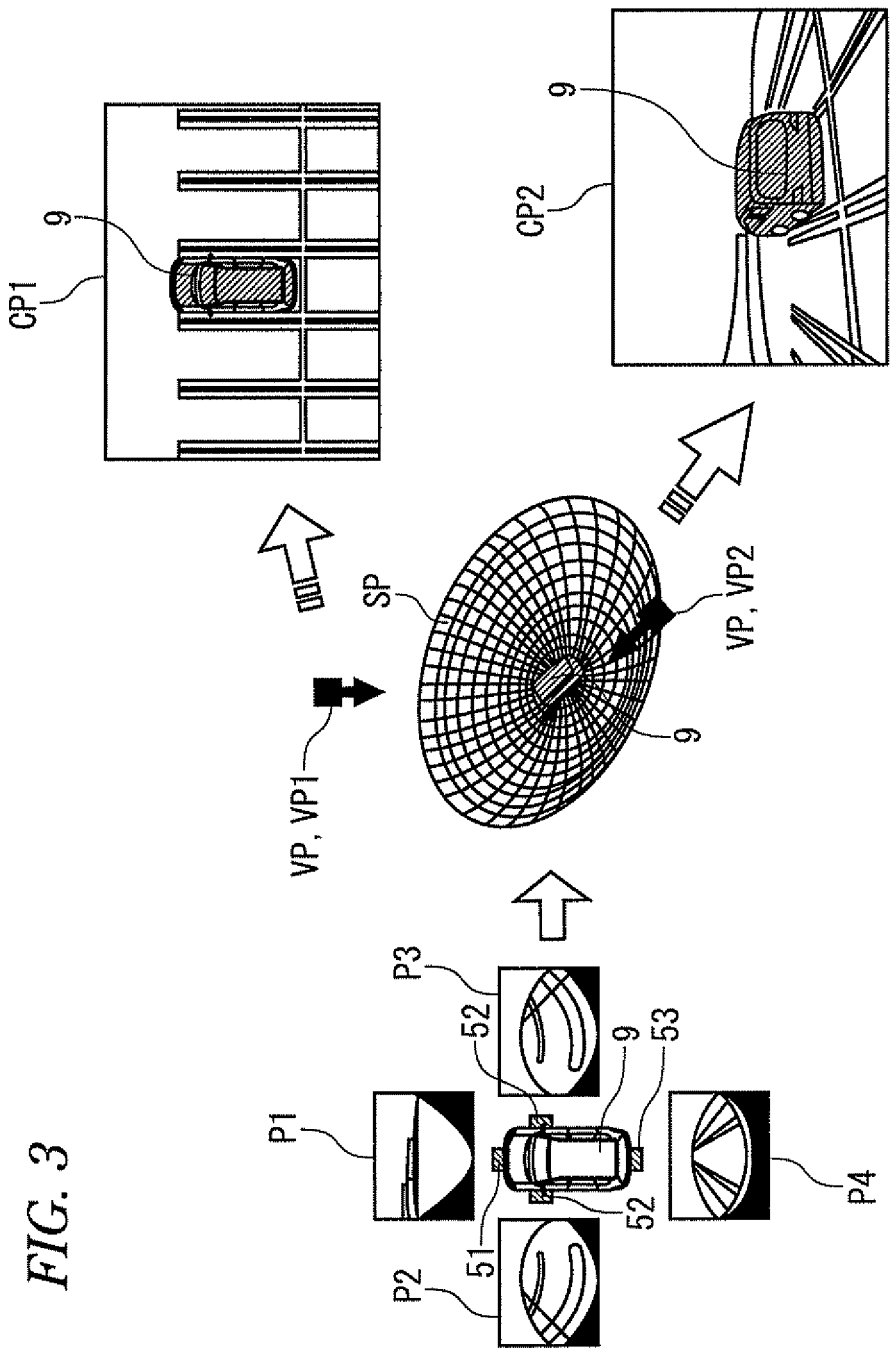
FIG. 3 is a view for explanation of a method for generating a synthetic image.

Next, it will be described how the synthetic image generating section 32 of the image processing section 3 generates a synthetic image showing the periphery of the vehicle 9 viewed from a certain virtual viewpoint based on a plurality of captured images that have been obtained from the image capturing section 5. When generating a synthetic image, the data 7 by vehicle models that have been stored in advance in the non-volatile memory 40 are used. FIG. 3 is a view for explanation of a method for generating a synthetic image.

When the front camera 51, the side cameras 52, and the back camera 53 of the capturing section 5 capture images at the same time, four captured images P1 to P4 showing the front, the left and right sides, and the rear of the vehicle 9, respectively, are acquired. That is, the four captured images P1 to P4 that are acquired from the image capturing section 5 include information presenting the entire circumference of the vehicle 9 at the capturing time.

Thereafter, each pixel of the four captured images P1 to P4 is projected onto a three-dimensional curved surface SP in an imaginary three-dimensional space. For example, the three-dimensional curved surface SP is substantially in a hemisphere (bowl) shape. The central part of the three-dimensional curved surface SP (bottom part of a bowl) is set as a position of the vehicle 9. A corresponding relation between a position of each pixel included in the captured images P1 to P4 and a position of each pixel of the three-dimensional curved surface SP is predetermined. Accordingly, a value for each pixel of the three-dimensional curved surface SP can be determined based on the corresponding relation and a value for each pixel included in the captured images P1 to P4.

The corresponding relation between a position of each pixel of the captured images P1 to P4 and a position of each pixel of the three-dimensional curved surface SP depends on positions (mutual distance, height above the ground, optical axes, angles, and others) of the four vehicle mounting cameras 51, 52, and 53 on the vehicle 9. Accordingly, table data presenting the corresponding relation are included in the data 7 by vehicle models that are stored in the non-volatile memory 40.

Also, polygon data that present a shape or a size of the vehicle body and are included in the data 7 by vehicle models are used. A vehicle image in a polygon model showing a three-dimensional shape of the vehicle 9 is imaginarily constructed. The constructed vehicle image is disposed at the central part of the substantially hemisphere (bowl) shape that is set as a position of the vehicle 9, in the three-dimensional space where the three-dimensional curved surface SP is set.

A virtual viewpoint VP is set by the control section 1, to the three-dimensional space where the three-dimensional curved surface SP exists. The virtual viewpoint VP is defined with a viewpoint position and a visual field direction, and set at a certain virtual viewpoint position that corresponds to the periphery of the vehicle 9 in the three-dimensional space toward a certain visual field direction.

In accordance with the set virtual viewpoint VP, a necessary area on the three-dimensional curved surface SP is cut out as an image. A relation between the virtual viewpoint VP and the necessary area on the three-dimensional curved surface SP is predetermined and stored in advance as table data in the non-volatile memory 40 or others. In accordance with the set virtual viewpoint VP, rendering to the vehicle image constructed in polygon is carried out. A two-dimensional vehicle image obtained from the rendering overlaps with the image that has been cut out. Accordingly, a synthetic image showing the vehicle 9 and the periphery of the vehicle 9 viewed from a certain virtual viewpoint is generated.

For example, in case of setting a virtual viewpoint VP1, in which the viewpoint position is directly above substantially a center of the position of the vehicle 9, and the visual field direction is toward a substantially directly downward direction, a synthetic image CP1 showing the vehicle 9 (actually, a vehicle image) and the periphery of the vehicle 9 in the state that the vehicle 9 is looked down from substantially directly above the vehicle 9 is generated. As illustrated in the same drawing, in case of setting a virtual viewpoint VP2, in which the viewpoint position is at the left rear of the vehicle 9, and the visual field direction is toward substantially the front of the vehicle 9, a synthetic image CP2 showing the vehicle 9 (actually, a vehicle image) and the periphery of the vehicle 9 in the state the entire periphery of the vehicle 9 is looked from the left rear of the vehicle 9 is generated.

When a synthetic image is actually generated, there is no need to determine values for all pixels of the three-dimensional curved surface SP. Values only for pixels of the necessary area in correspondence to the set virtual viewpoint VP are determined based on the captured images P1 to P4, thereby increasing the processing speed.

1-3. Operation Mode

Figure 4:
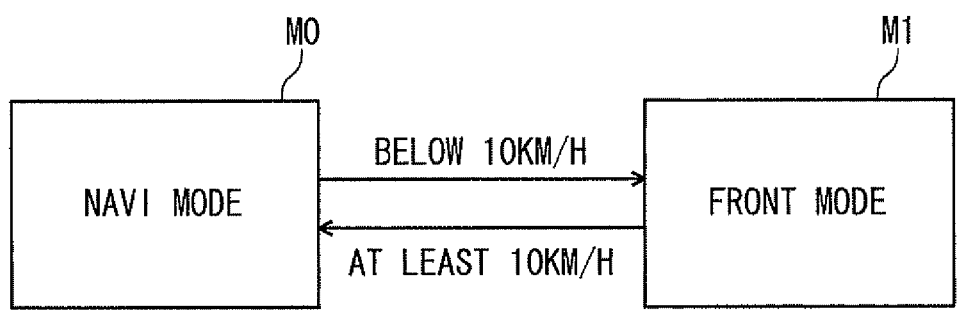
FIG. 4 is a view showing transition of an operation mode of an image display system.

Next, an operation mode of the image display system 100 will be described. FIG. 4 is a view showing transition of an operation mode of the image display system 100. In the image display system 100, the operation mode is automatically switched between a navigation mode M0 and a front mode M1. Meanwhile, the image display system 100 may further include, as the operation mode, a back mode that displays a peripheral image showing the rear area of the vehicle 9, when the shift lever is operated to be "R."

The navigation mode M0 is an operation mode that displays a map image for navigation guide or others on the display 21, through the function of the navigation apparatus 20. In the navigation mode M0, the functions of the image capturing section 5 and the image generating apparatus 10 are not used. Various displays are carries out by the function of the navigation apparatus 20 as a single unit. Accordingly, if the navigation apparatus 20 has a function of receiving and displaying a TV broadcasting radio wave, a TV broadcasting screen may be displayed, instead of the map image for navigation guide.

The front mode M1 is an operation mode that displays a peripheral image showing peripheral circumferences of the vehicle 9 on the display 21 almost in real time, by using the functions of the image capturing section 5 and the image generating apparatus 10. In the front mode M1, a peripheral image showing the front or side area of the vehicle 9 necessary upon advancing the vehicle 9 is displayed.

In the navigation mode M0, when the traveling speed input from the vehicle speed sensor 82 drops to below a predetermined threshold value (10 km/h in Embodiment 1), the operation mode is automatically switched to the front mode M1, under control by the control section 1. In the front mode M1, when the traveling speed reaches at least a predetermined threshold value (10 km/h in Embodiment 1), the operation mode is automatically switched to the navigation mode M0, under control by the control section 1.

If the traveling speed of the vehicle 9 is relatively high, the front mode M1 is released thereby enabling the driver to concentrate on the driving, and the operation mode becomes the navigation mode M0. In reverse, if the traveling speed of the vehicle 9 is relatively low, it is highly likely that the driver is performing driving operation that especially requires monitoring the periphery of the vehicle 9, e.g., approaching an intersection where views are poor, passing near another vehicle coming the other way, or moving the vehicle toward a roadside. Accordingly, when the traveling speed is relatively low, the operation mode is automatically switched to the front mode M1 primarily showing the front or side area of the vehicle 9.

Meanwhile, a threshold value for switching the navigation mode M0 to the front mode M1, and a threshold value for switching the front mode M1 to the navigation mode M0 may be different. The operation mode may be switched between the navigation mode M0 and the front mode M1, even in the case where an explicit operation instruction has been made from a user.

1-4. Front Mode

Figure 5:
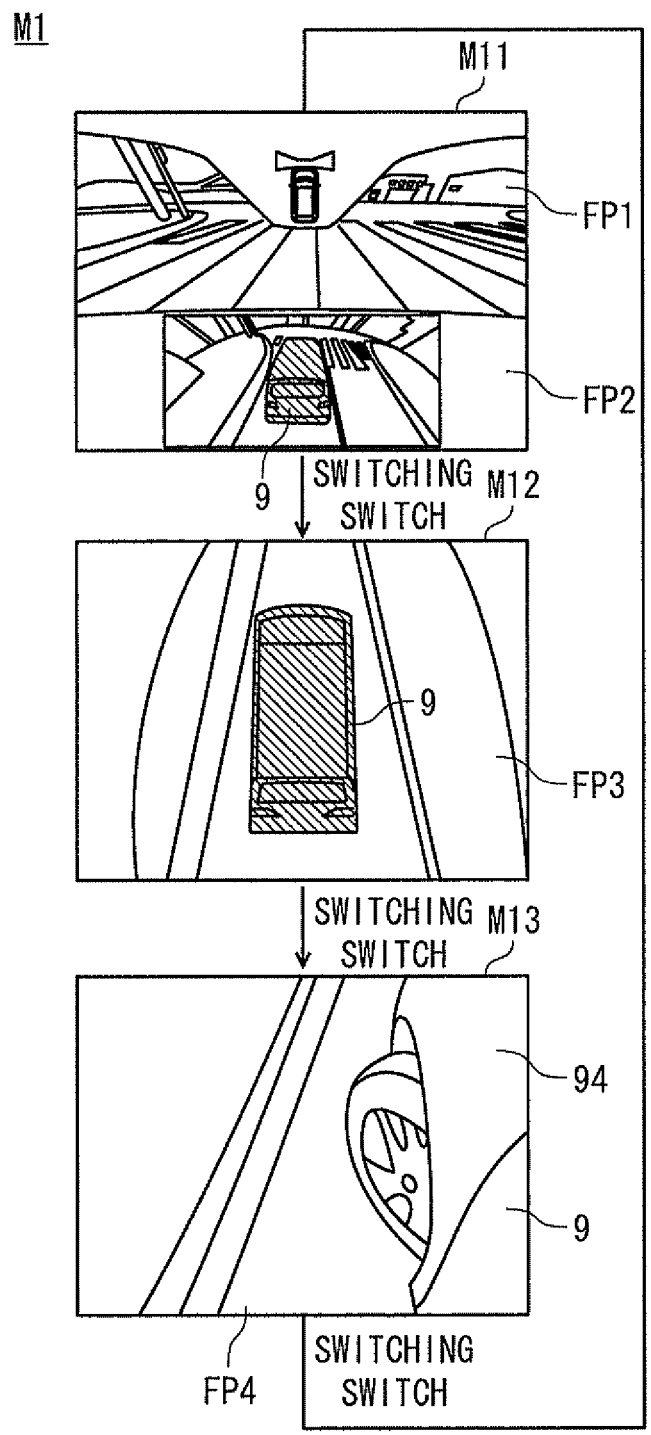
FIG. 5 is a view showing transition of a display mode in a front mode.

Next, a display aspect of the periphery of the vehicle 9 in the front mode M1 will be described. FIG. 5 is a view showing transition of a display mode in the front mode M1. The front mode M1 includes three display modes, i.e., a front/side mode M11, a passing near mode M12, and a side camera mode M13. The display modes are different in a display aspect. Each time a user presses the switching switch 43, the display mode is switched to the front/side mode M11, the passing near mode M12, and the side camera mode M13 in this order under control by the control section 1. In the side camera mode M13, when the switching switch 43 is pressed, the display mode is returned to the front/side mode M11.

The front/side mode M11 displays a screen containing a front image FP1 obtained from image capturing in the front camera 51 and a synthetic image FP2 showing the side area of the vehicle 9 viewed from the virtual viewpoint VP side by side on the display 21. In the front/side mode M11, two images, i.e., the front image FP1 showing the front area of the vehicle 9 and the synthetic image FP2 showing the side area of the vehicle 9 are displayed on the same screen.

The passing near mode M12 displays a screen containing only one synthetic image FP3 viewed from the virtual viewpoint VP on the display 21. The side camera mode M13 displays a screen containing only one side image FP4 obtained from image capturing in the side cameras 52 on the display 21.

1-4-1. Front/Side Mode

Figure 6:
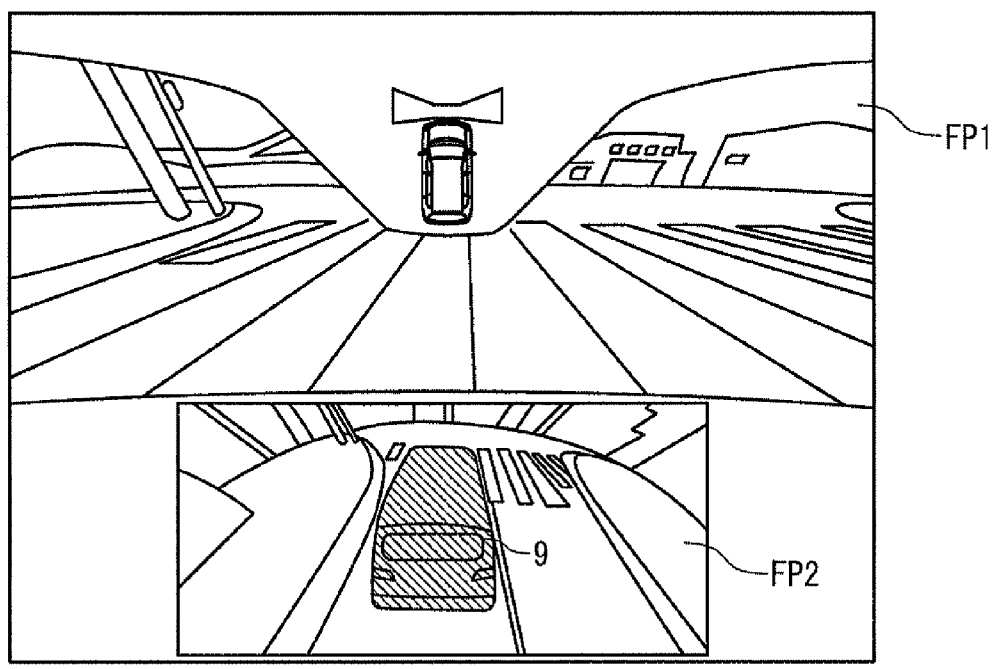
FIG. 6 is a view showing an example of a screen of a front/side mode.

FIG. 6 is a view showing an example of a screen to be displayed on the display 21 in the front/side mode M11. As illustrated in FIG. 6, on a screen in the front/side mode M11, the front image FP1 is positioned at an upper part, and the synthetic image FP2 is positioned at a lower part. The front image FP1 is not a synthetic image from the virtual viewpoint VP, but is a display image obtained in the manner that a captured image, which has been obtained from image capturing in the front camera 51, is adjusted by the image adjusting section 31 to be a display image. The synthetic image FP2 is a synthetic image primarily showing the side area of the vehicle 9 viewed from the virtual viewpoint VP directed from the rear position of the vehicle 9 toward the front of the vehicle 9.

Figure 7:
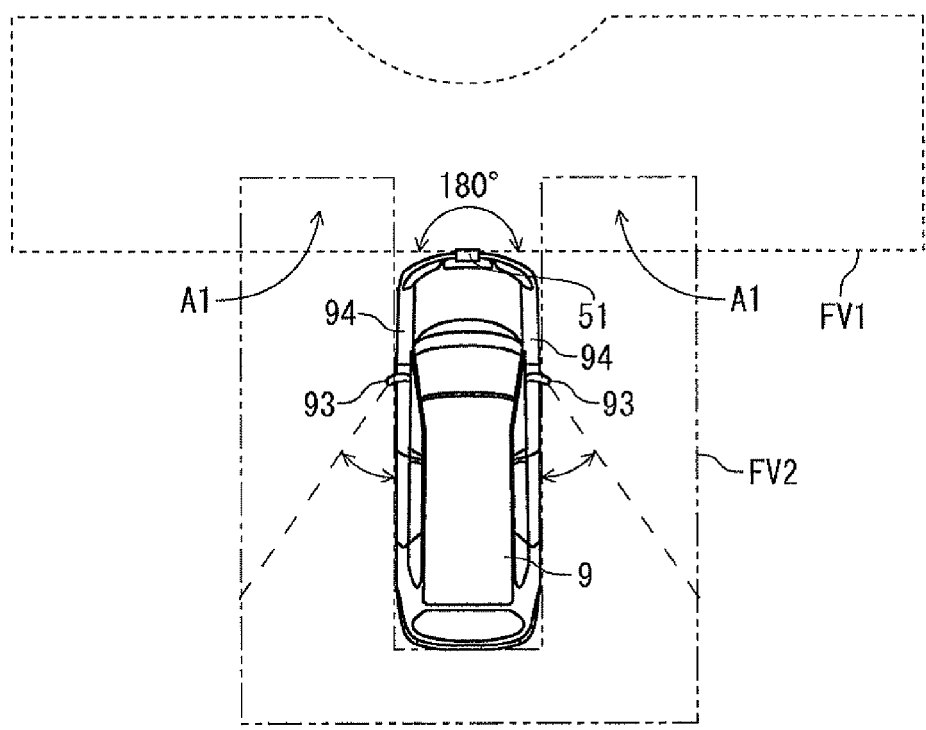
FIG. 7 is a view for explanation of a visual field scope presented in a front/side mode.

FIG. 7 is a view for explanation of a visual field scope around the vehicle 9 presented in the front/side mode M11. In FIG. 7, a scope FV1 presented by a dashed line is a visual field scope presented in the front image FP1. A scope FV2 presented by a chain double-dashed line is a visual field scope presented in the synthetic image FP2. The visual field scopes FV1 and FV2 partially overlap with each other in an area A2, which is a boundary of the scopes.

In the front image FP1, an area extending in the left and right directions and having a 180° horizontal angle at the front area of the vehicle 9 is set as the visual field scope FV1. A user sees the front image FP1, so that he/she can monitor an object existing in the area extending in the left and right directions at the front area of the vehicle 9 that is easily blinded when approaching an intersection where views are poor.

In the synthetic image FP2, a scope that includes the left and right side areas of the vehicle 9 from the front of the front end of the vehicle 9 to the rear of the rear end of the vehicle 9, and the rear area of the vehicle 9 is set as the visual field scope FV2. A user sees the synthetic image FP2, so that he/she can monitor an object existing in the side areas or the rear area. The visual field scope FV2 also includes an area that is easily blinded from the driver's seat, i.e., an area near the outside of the front fender 94 that is not seen on the door mirror 93.

In the front/side mode M11, it is possible for a user to see the two images FP1 and FP2 of the visual field scopes FV1 and FV2 at the same time without switching a screen (refer to FIG. 6). Accordingly, the user can monitor the front area and the side areas of the vehicle 9 at once.

The viewpoint position of the virtual viewpoint VP of the synthetic image FP2 is set to the rear position of the vehicle 9. The visual field direction is set to the front direction of the vehicle 9. Accordingly, as illustrated in FIG. 6, the synthetic image FP2 shows the periphery of the vehicle 9 in the state that the vehicle 9 is viewed from the rear position of the vehicle 9 toward the front direction, together with the image of the vehicle 9. Since the visual field direction of the front image FP1, the visual field direction of the synthetic image FP2, and the visual field direction of a user are substantially identical, the user is not confused of the direction toward which an object presented on the screen of the display 21 exists. The user does not need to make complicated thinking such as conducting coordinate transformation in his/her mind, so that the user can intuitively recognize the positional relation between an object displayed on the display 21 and the vehicle 9.

1-4-2. Passing Near Mode

Returning to FIG. 5, a display aspect in the passing near mode M12 will be described. The passing near mode M12 considers the case of passing near another vehicle coming the other way on a narrow road or others, and is a specified display mode in that case. The display 21 displays a screen containing only the synthetic image FP3. The viewpoint position of the virtual viewpoint VP of the synthetic image FP3 is set to a position directly above the rear end of the vehicle 9. The visual field direction is toward substantially a center of the vehicle 9. Accordingly, the synthetic image FP3 shows the left and right side areas of the vehicle 9 in the state that the vehicle 9 is looked down from above the vehicle 9.

Figure 8:
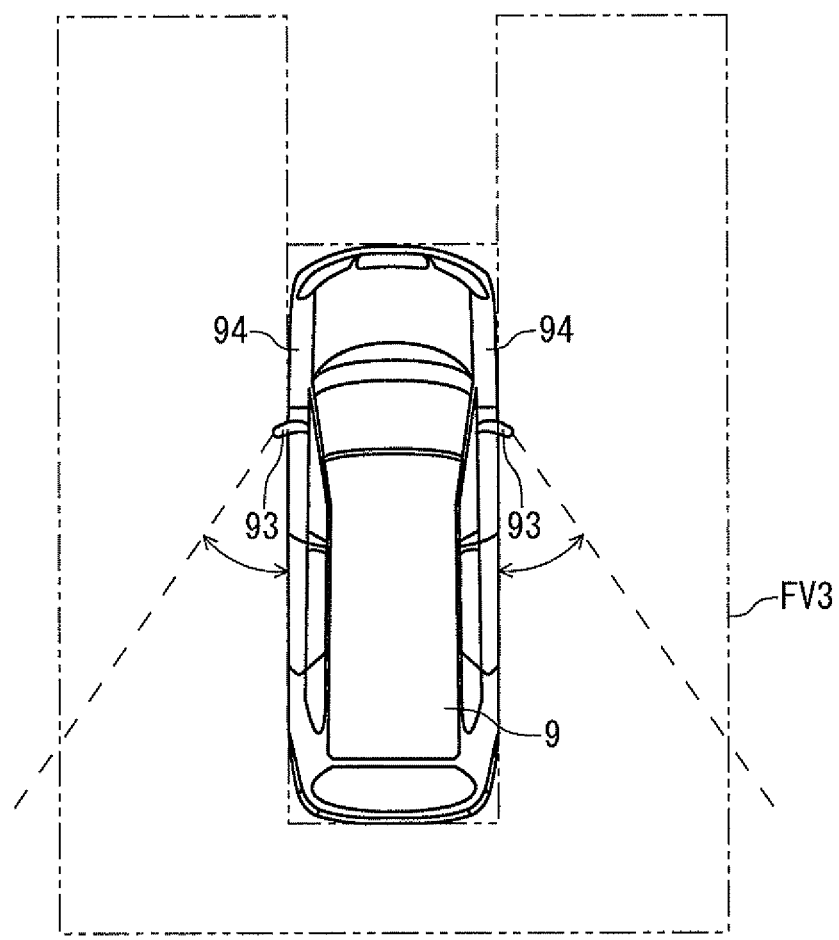
FIG. 8 is a view for explanation of a visual field scope presented in a passing near mode.

FIG. 8 is a view for explanation of a visual field scope around the vehicle 9 presented in the passing near mode M12. In FIG. 8, a scope FV3 presented by a chain double-dashed line is a visual field scope presented in the synthetic image FP3. In the synthetic image FP3, a scope that includes the left and right side areas of the vehicle 9 from the front of the front end of the vehicle 9 to the rear of the rear end of the vehicle 9, and the rear area of the vehicle 9 is set as the visual field scope FV3.

As shown from comparison of FIGS. 7 and 8, the visual field scope FV3 of the synthetic image FP3 and the visual field scope FV2 of the synthetic image FP2 in the front/side mode M11 are similar to each other. However, the visual field scope FV3 is extended toward the front of the vehicle 9, compared to the visual field scope FV2. The area that is included in the visual field scope FV3 and out of the visual field scope FV2 is included in the visual field scope FV1 of the front image FP1. That is, the visual field scope FV3 of the passing near mode M12 is included in one of the two visual field scopes FV1 and FV2 of the front/side mode M11.

In case of passing near another car coming the other way on a narrow road or others, a user needs to monitor both the clearance with the vehicle coming the other way, and the clearance between the vehicle body and an object at the side of the vehicle. In other words, both the left and right sides of the vehicle 9 from the front of the front end of the vehicle 9 to the rear end of the vehicle 9 needs to be monitored. Meanwhile, in case of passing near another vehicle coming the other way, it is unnecessary to monitor the area extending to the left and the right at the front area of the vehicle 9 presented in the front image FP1 of the front side mode M11. In the passing near mode M12, the display 21 displays a screen including the synthetic image FP3 showing only the left and right side areas of the vehicle 9, so that the user can easily monitor the area where he/she wants to monitor in case of passing near another vehicle coming the other way.

1-4-3. Side Camera Mode

Returning to FIG. 5, a display aspect in the side camera mode M13 will be described. The side camera mode M13 considers the case of moving a vehicle toward a roadside or others, and is a specified display mode in that case. The display 12 displays only the side image FP4.

Figure 9:
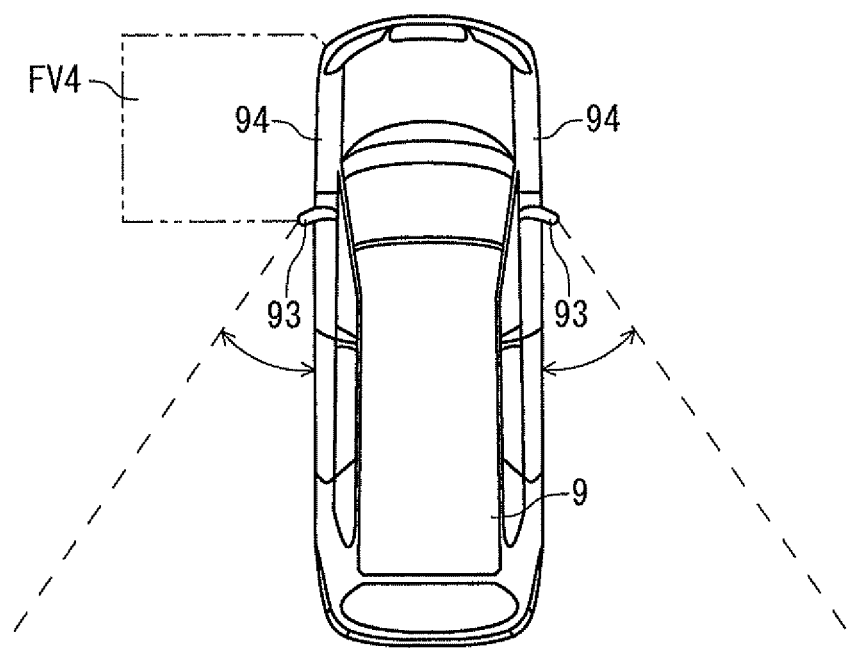
FIG. 9 is a view for explanation of a visual field scope presented in a side camera mode.

FIG. 9 is a view for explanation of a visual field scope around the vehicle 9 presented in the side camera mode M13. In FIG. 9, a scope FV4 presented by a chain double-dashed line is a visual field scope presented in the synthetic image FP2. The outside area of the front fender 94 of the vehicle 9, which is opposite (left side in the vehicle 9) to the driver's seat (right side in the vehicle 9), is set as the visual field scope FV4. The visual field scope FV4 of the side camera mode M13 is included in the visual field scope FV2 of the synthetic image FP2 of the front/side mode M11 illustrated in FIG. 7.

In case of moving a vehicle toward a roadside, the clearance between the vehicle body moving toward the roadside, and an object at the side of the vehicle needs to be monitored. In general, the opposite side of the driver's seat moves toward the roadside. The side area opposite to the driver's seat, in particular, the outside area of the front fender 94 of the vehicle 9 is easily blinded. In the side camera mode M13, the display 21 displays a screen containing the side image FP4 showing only the outside area of the front fender 94 opposite to the driver's seat. Since the area is enlarged and displayed, a user can easily monitor the area where he/she needs to monitor in case of moving the vehicle toward a roadside.

1-5. Basic Operation

As described, in the passing near mode M12, a screen, which contains only one peripheral image showing a specified side area in case of passing near another vehicle coming the other way, is displayed. In the side camera mode M13, a screen, which contains only one peripheral image showing a specified side area in case of moving the vehicle toward a roadside, is displayed.

In the front/side mode M11, a screen, which contains both an image showing the front area of the vehicle 9 and an image showing the side area of the vehicle 9, is displayed. In other words, in the front/side mode M11, the front area and the side area of the vehicle 9 can be monitored at once. The visual field scope FV3 of the passing near mode M12 and the visual field scope FV4 of the side camera mode M13 are included in any one of the two visual field scopes FV1 and FV2 of the front/side mode M11. Accordingly, the front/side mode M11 can be used in all circumstances such as approaching an intersection, passing near another vehicle, and moving a vehicle toward a roadside. In other words, the front/side mode M11 is a display mode that provides the largest visual field scope in the other display modes, and has high generality.

As described, in the image display system 100, when the traveling speed is reduced, the operation mode is automatically switched to the front mode M1. In this case, the circumstance intended by the driver may be any of approaching an intersection, passing near another vehicle, and moving a vehicle toward a roadside. In the image display system 100, in order to respond to any circumstances, the display mode is switched to the front/side mode M11 for displaying the front image FP1 and the synthetic image FP2, which are juxtaposed to each other, at the time that the traveling speed of the vehicle 9 drops to below a predetermined threshold value, and making the navigation apparatus 20 display a peripheral image is started. Immediately after the traveling speed is reduced such that the operation mode is automatically switched to the front mode M1, and the operation to display a peripheral image is started, the display mode becomes the front/side mode M11 having high generality. That is, the display mode becomes the front/side mode M11, from the time that the operation to display a peripheral image is started.

Figure 10:
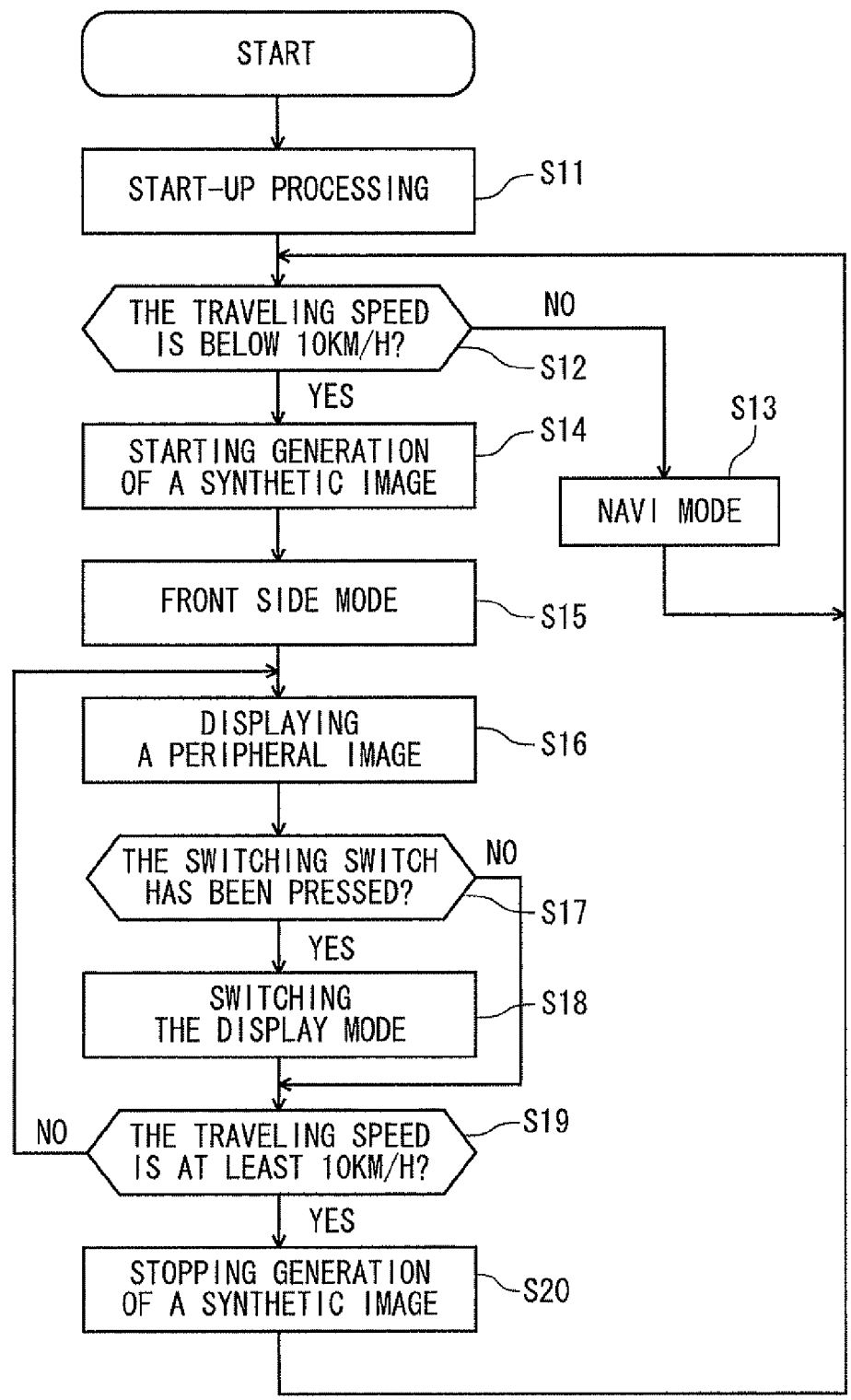
FIG. 10 is a view showing flow of basic operation of an image display system in Embodiment 1.

Hereinafter, operation of the image display system 100 will be described. Power is supplied to the image display system 100 from a battery equipped in the vehicle 9 through an ACC switch. When the ACC switch is on such that power is supplied, the image display system 100 is activated. When the ACC switch is off, the image display system 100 is stopped. FIG. 10 is a view showing flow of basic operation of the image display system 100 during the time that the image display system 100 is activated.

When the image display system 100 is activated, the control section 1 carries out various start-up processing. For example, in the start-up processing, the data 7 by vehicle models are read from the non-volatile memory 40 and stored in the RAM of the control section 1, such that the data are in the state useful for follow-up processing (S11).

When the start-up processing is finished, the control section 1 continuously monitors the traveling speed of the vehicle 9 (S12). When the traveling speed of the vehicle 9 is at least 10 km/h (No in S12), the operation mode becomes the navigation mode M0 under control by the control section 1, and various displays are carried out on the display 21 through the function of the navigation apparatus 20 as a single unit (S13).

When the traveling speed of the vehicle 9 is below 10 km/h (Yes in S12), the operation mode becomes the front mode M1 under control by the control section 1, and the synthetic image generating section 32 starts generating a synthetic image at that time (S14). Thereafter, until the traveling speed of the vehicle 9 reaches at least 10 km/h (during No in S19), displaying a peripheral image showing the periphery of the vehicle 9 on the display 21 is carried out, such that the peripheral circumstances of the vehicle 9 are provided to the user (a driver as a representative example) almost in real time.

Immediately after the traveling speed of the vehicle 9 drops to below 10 km/h such that the operation mode becomes the front mode M1, the display mode is set to the front/side mode M11 having high generality under control by the control section 1 (S15). Accordingly, the display mode becomes the front/side mode M11 from the time that the front mode M1 is started, such that the display 21 displays both the front area and the side area of the vehicle at the same time.

In the front mode M1, when the switching switch 43 is pressed (Yes in S17), the display mode is switched to the front/side mode M11, the passing near mode M12, and the side camera mode M13 in this order under control by the control section 1 (S18). Accordingly, the user monitors an area where he/she wants to monitor by using the screen of the front/side mode M11 having high generality. If the user wants to see a screen specified in his/her intended circumstance, the user presses the switching switch 43 to switch the display mode to the passing near mode M12 or the side camera mode M13.

In the front mode M1, when the traveling speed of the vehicle 9 reaches at least 10 km/h (Yes in S19), the synthetic image generating section 32 stops generating a synthetic image (S20). The processing is returned to S12 to monitor once again whether the traveling speed of the vehicle 9 drops to below 10 km/h.

As described, in the image display system 100, immediately after the traveling speed of the vehicle 9 drops to below a predetermined threshold value such that the operation mode becomes the front mode M1, and the operation to display a peripheral image is started, the display mode becomes the front/side mode M11, which is capable of simultaneously displaying the front area and the side area of the vehicle 9, and has high generality. That is, the display mode becomes the front/side mode M11 from the time that the front mode M1 is started. The screen presented in the front/side mode M11 can respond to various circumstances such as approaching an intersection, passing near another vehicle, and moving a vehicle toward a roadside. Accordingly, the user can monitor circumstances of a necessary area around the vehicle 9, without switching the display mode.

1-6. Interaction of Operation of a Direction Indicator Device

In the front side mode M11, the viewpoint position of the virtual viewpoint VP of the synthetic image FP2 moves under control by the control section 1, in response to driver's operation to the winker switch of the direction indicator 83.

Figure 11:
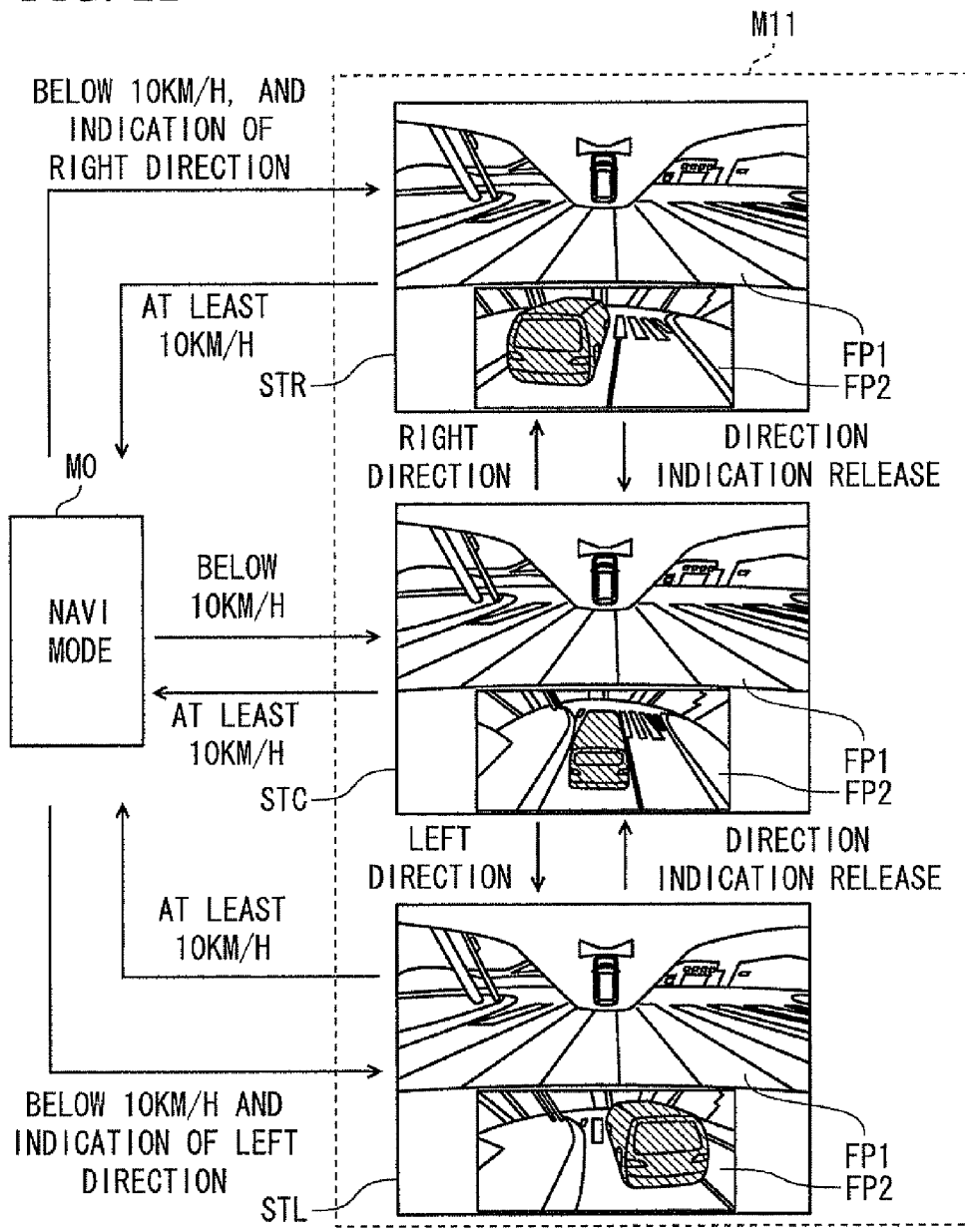
FIG. 11 is a view showing screen state transition in a front/side mode.
Figure 12:
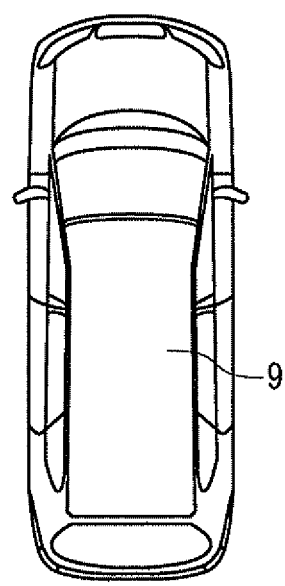
FIG. 12 is a view showing transition of a position of a virtual viewpoint.
Figure 12:
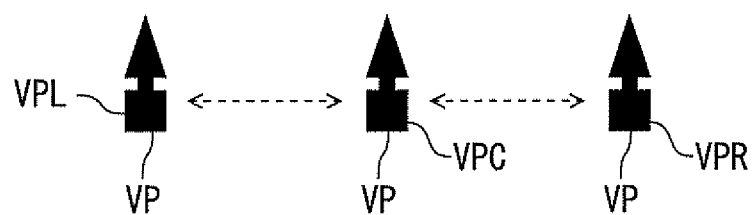

FIG. 11 is a view showing screen state transition in the front/side mode M11. FIG. 12 is a view showing transition of a position of a virtual viewpoint VP. If a turn signal input from the direction indicator device 83 is off, namely, there is no direction indication, the viewpoint position of the virtual viewpoint VP is set to a position VPC (refer to FIG. 12) substantially in a center of the left and the right at the rear of the vehicle 9, and the visual field direction is set to the front direction of the vehicle 9. Accordingly, as shown in a state STC of FIG. 11, the synthetic image FP2 that substantially equally includes the left and right side areas of the vehicle 9 is generated.

If the turn signal input from the direction indicator 83 is on, namely, there is direction indication, the viewpoint position of the virtual viewpoint VP moves to the position of the direction indicated by the turn signal, in the state that the visual field direction is toward the front direction of the vehicle 9.

Specifically, if the turn signal indicates a left direction, the viewpoint position of the virtual viewpoint VP is set to a position VPL of the left side of the vehicle 9 (refer to FIG. 12). Accordingly, as shown in a state STL of FIG. 11, the synthetic image FP2 that shows the side area of the left direction indicated by the turn signal larger in size than the side area of the right direction is generated and displayed on the display 21. In this case as well, the synthetic image FP2 shows the periphery of the vehicle 9 in the state that the vehicle 9 is looked from the rear position of the vehicle 9 to the front direction of the vehicle 9.

If the turn signal indicates a right direction, the viewpoint position of the virtual viewpoint VP is set to a position VPR of the right side of the vehicle 9 (refer to FIG. 12). Accordingly, as shown in a state STR of FIG. 11, the synthetic image FP2 that shows the side area of the right direction indicated by the turn signal of the direction indicator 83 larger in size than the side area of the left direction is generated and displayed on the display 21. In this case as well, the synthetic image FP2 shows the periphery of the vehicle 9 in the state that the vehicle 9 is looked from the rear position of the vehicle 9 toward the front direction of the vehicle 9.

In the direction indicated by the direction indicator 83, there is most likely an object, with which the vehicle 9 may contact when the vehicle 9 moves upon changing a direction or moving toward a roadside. The side area in the direction indicated by the direction indicator 83 is largely displayed, such that a user (a driver as a representative example) can pay his/her attention to the object with which the vehicle 9 may contact. Accordingly, the vehicle 9 can be effectively prevented from contacting with the object. When the direction indication is released, as shown in a state STC of FIG. 11, the synthetic image FP2 that substantially equally includes the left and right side areas of the vehicle 9 is displayed.

As described, in the image display system 100, when the traveling speed of the vehicle 9 is below 10 km/h such that the operation mode shifts to the front mode M1, the display mode automatically becomes the front side mode M11 from the time that the front mode M1 is started. If the turn signal input from the direction indicator 83 is on, namely, there is direction indication, at the time that the traveling speed of the vehicle 9 is below 10 km/h, the synthetic image FP2 that largely shows the side area in the direction indicated by the direction indicator device 83 is generated, and displayed on the display 21.

Specifically, if the turn signal indicates a left direction at the time that the traveling speed is below 10 km/h, the display state becomes the state shown in the state STL of FIG. 11 from the time that the front/side mode M11 is started. If the turn signal indicates a right direction at the time that the traveling speed is below 10 km/h, the display state becomes the state shown in the state STR of FIG. 11 from the time that the front/side mode M11 is started.

As described, if there is direction indication, the side area in the direction indicated by the direction indicator 83 is largely displayed from the time that the front mode M1 is started, namely, the operation to display a peripheral image is started. Accordingly, a user (a driver as a representative example) can quickly pay his/her attention to an object that is likely to contact with the vehicle.

2. Embodiment 2

Next, Embodiment 2 will be described. The configuration and processing of the image display system in Embodiment 2 are partially different from and substantially the same as those in Embodiment 1. Hereinafter, Embodiment 2 will be described based on the differences between Embodiments 1 and 2.

In Embodiment 1, the synthetic image generating section 32 generates a synthetic image at the time that the operation mode becomes the front mode M1. Since a synthetic image is generated only when the synthetic image is displayed, unnecessary image processing is not executed, so that power consumption can be reduced. However, it takes some time before generating a synthetic image is started, and the synthetic image is displayed on the display 21. Accordingly, there may be a case where the synthetic image could not be quickly displayed on the display 21 at the time that the operation mode becomes the front mode M1. In Embodiment 2, a synthetic image is continuously generated during the time that the image generating apparatus 10 is activated.

Figure 13:
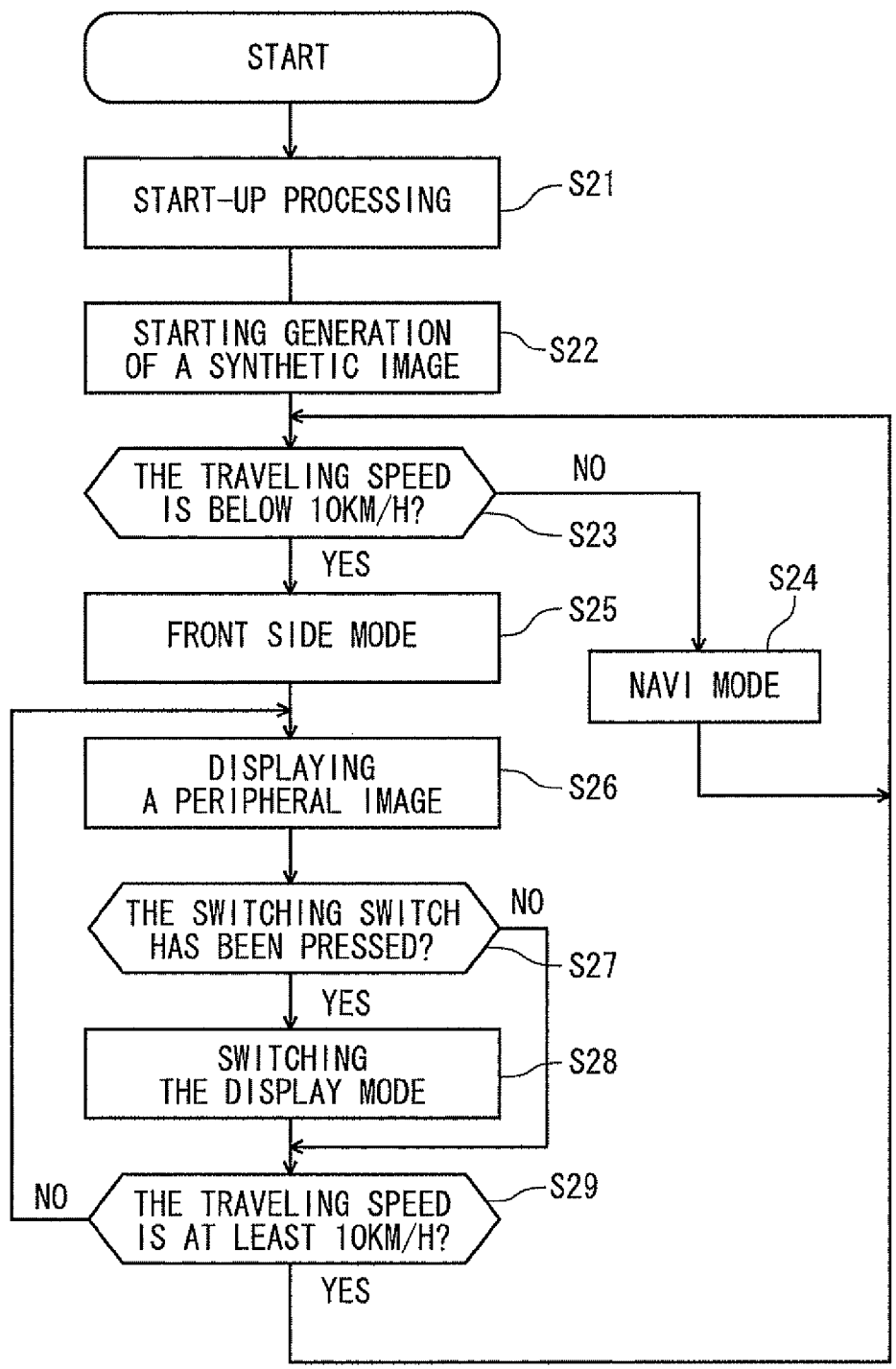
FIG. 13 is a view showing flow of basic operation of an image display system in Embodiment 2.

FIG. 13 is a view showing flow of basic operation during the time that the image display system 100 of Embodiment 2 is activated. The image display system 100 also is activated when the ACC switch is on such that power is supplied, and stopped when the ACC switch is off.

When the image display system 100 is activated, the control section 1 carries out various start-up processing (S21). When the start-up processing is finished, the synthetic image generating section 32 starts generating a synthetic image (S22). Thereafter, a synthetic image is continuously generated until the image display system 100 is stopped. That is, a synthetic image is continuously generated during the time that the image display system 100 is activated.

Once generating a synthetic image is started, the traveling speed of the vehicle 9 is continuously monitored by the control section 1 (S23). When the traveling speed of the vehicle 9 is at least 10 km/h (No in S23), the operation mode becomes the navigation mode M0 (S24).

When the traveling speed of the vehicle 9 is below 10 km/h (Yes in S23), the operation mode becomes the front mode M1, and the display mode is set to the front/side mode M11 (S25). And, the synthetic image is displayed on the display 21 (S26). Since generating a synthetic image was being already executed at that time, the synthetic image can be displayed on the display 21 almost at the same time when the operation mode becomes the front mode M1.

Thereafter, displaying a peripheral image showing the periphery of the vehicle 9 on the display 21 is carried out, until the traveling speed of the vehicle 9 reaches at least 10 km/h (during No in S29) (S26). During that time, once the switching switch 43 is pressed in the front mode M1 (Yes in S27), the display mode is switched (S28).

When the traveling speed of the vehicle 9 reaches at least 10 km/h (Yes in S29), the processing is returned to S22, to monitor once again whether the traveling speed of the vehicle 9 becomes below 10 km/h. At this time, the synthetic image generating section 32 continues to generate a synthetic image.

As described, in the image display system 100 of Embodiment 2, a synthetic image is continuously generated during the time that the system is activated. Accordingly, a synthetic image can be displayed immediately when the synthetic image needs to be displayed.

3. Embodiment 3

Next, Embodiment 3 will be described. The configuration and processing of the image display system in Embodiment 3 are partially different from and substantially the same as those in Embodiment 1. Hereinafter, Embodiment 3 will be described based on the differences between Embodiments 1 and 3.

In Embodiment 1, since the synthetic image generating section 32 starts generating a synthetic image at the time that the operation mode becomes the front mode M1, power consumption is reduced. In Embodiment 2, since a synthetic image is continuously generated during the time that the image generating apparatus 10 is activated. Accordingly, a synthetic image can be quickly generated when the synthetic image needs to be displayed.

In Embodiment 3, the traveling speed of the vehicle 9 is set to a second threshold value (e.g., 20 km/h), which is higher than the first threshold value (e.g., 10 km/h) for displaying a peripheral image. A synthetic image is generated when the traveling speed of the vehicle 9 drops to below the second threshold value. Accordingly, a synthetic image can be quickly displayed while reducing power consumption. In other words, Embodiment 3 realizes balance between power consumption and quickness in display, thereby accomplishing the merits of Embodiments 1 and 2.

Figure 14:
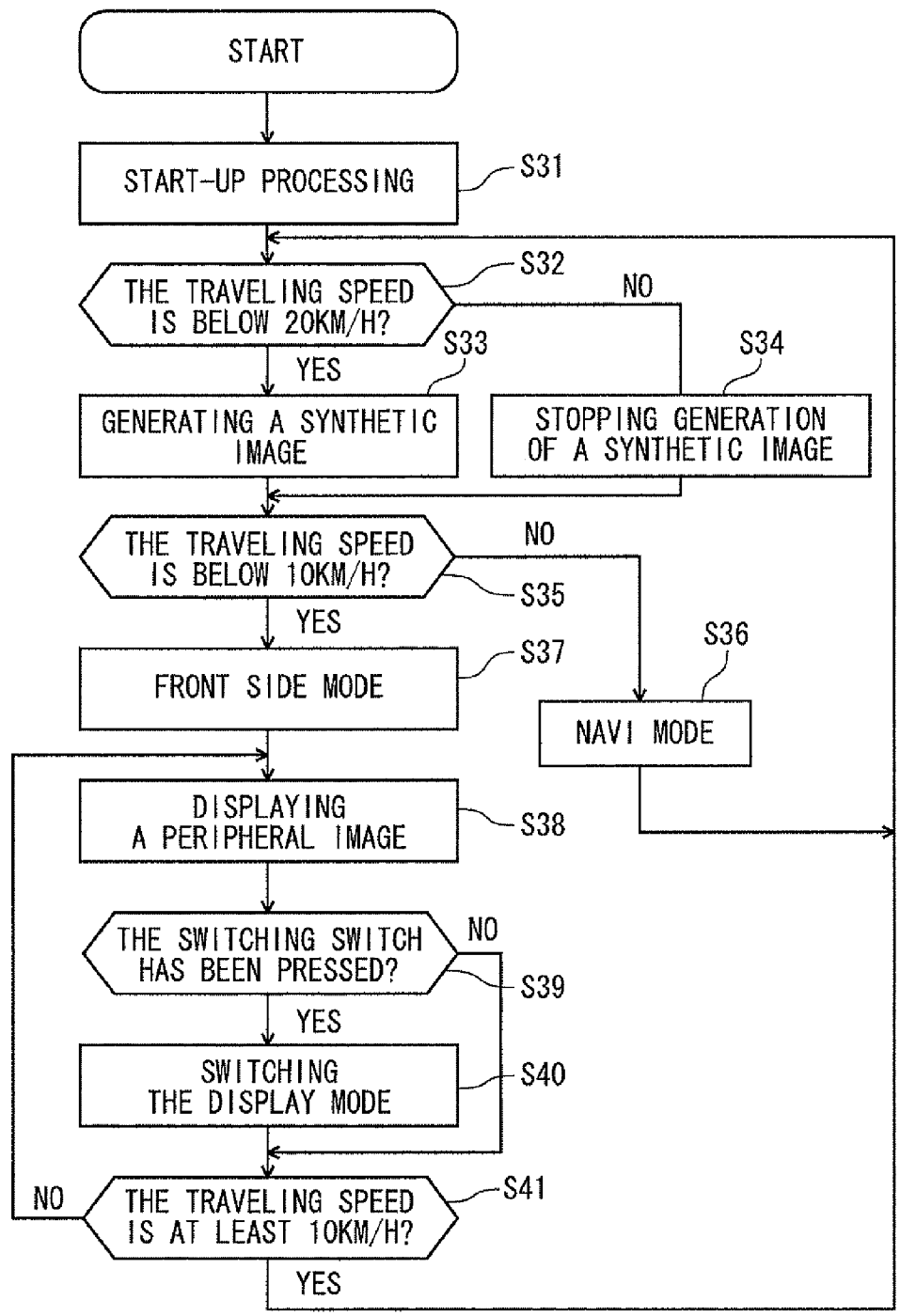
FIG. 14 is a view showing flow of basic operation of an image display system in Embodiment 3.

FIG. 14 is a view showing flow of basic operation during the time that the image display system 100 of Embodiment 3 is activated. The image display system 100 also is activated when the ACC switch is on such that power is supplied, and stopped when the ACC switch is off.

Once the image display system 100 is activated, the control section 1 first carries out various start-up processing (S31).

When the start-up processing is finished, the control section 1 continuously monitors the traveling speed of the vehicle 9 (S32). When the traveling speed of the vehicle 9 is below the second threshold value of 20 km/h (Yes in S32), the synthetic image generating section 32 generates a synthetic image (S33). When the traveling speed of the vehicle 9 is at least the second threshold value of 20 km/h (No in S32), the synthetic image generating section 32 stops generating a synthetic image (S34).

The control section 1 monitors the traveling speed of the vehicle 9 (S35). When the traveling speed of the vehicle 9 is at least 10 km/h (No in S24), the operation mode becomes the navigation mode m0 (S36), and the processing is returned to S32. That is, in the navigation mode M0, the control section 1 separately monitors whether the traveling speed of the vehicle 9 drops to below the second threshold value (20 km/h), and whether the traveling speed of the vehicle 9 drops to below the first threshold value (10 km/h).

Generating a synthetic image is started at the time that the traveling speed drops to below the second threshold value (20 km/h) (S32 and S33). The operation mode becomes the front mode M1 at the time that the traveling speed drops to below the first threshold value (10 km/h) (Yes in S35). Accordingly, the operation mode becomes the front mode M1, and the display mode is set to the front/side mode M11 (S37). At the time that a synthetic image is displayed on the display 21 (S38), generating a synthetic image is being already executed.

Accordingly, it is possible to quickly display a synthetic image on the display 21 when the operation mode becomes the front mode M1.

Thereafter, displaying a peripheral image showing the periphery of the vehicle 9 on the display 21 is carried out, until the traveling speed of the vehicle 9 reaches at least 10 km/h (during No in S41) (S38). During that time, when the switching switch 43 is pressed in the front mode M1 (Yes in S39), the display mode is switched (S40).

When the traveling speed of the vehicle 9 reaches at least 10 km/h (Yes in S41), the processing is returned to S32, and the traveling speed of the vehicle 9 and the second threshold value (20 km/h) are compared. Generating a synthetic image is continued until the traveling speed of the vehicle 9 reaches the second threshold value (20 km/h). If the traveling speed of the vehicle 9 reaches at least the second threshold value (20 km/h), generating a synthetic image is stopped.

As described, in the image display system 100 of Embodiment 3, generating a synthetic image is started at the time that the traveling speed of the vehicle 9 drops to below the second threshold value (20 km/h). Accordingly, when the traveling speed of the vehicle 9 drops to below the first threshold value (10 km/h), a synthetic image can be quickly displayed. When the traveling speed of the vehicle 9 is at least the second threshold value, generating a synthetic image is stopped. Accordingly, power consumption can be effectively reduced. Accordingly, it is possible to quickly display a synthetic image when the synthetic image needs to be displayed, while reducing power consumption.

4. Modified Embodiment

Embodiments of the present invention have been described. However, the present invention is not limited to the embodiments that have been described. Various modifications to the present invention may be made. Hereinafter, modified embodiments of the present invention will be described. Of course, the modifications set forth below may be properly combined.

In the embodiments that have been described, the image generating apparatus 10 and the navigation apparatus 20 are different. However, the navigation apparatus 20 and the image generating apparatus 10 may be disposed in the same housing to construct an integrated apparatus.

In the embodiments that have been described, the display apparatus that displays an image generated in the image generating apparatus 10 is the navigation apparatus 20. However, the display apparatus may be a general display apparatus that has not a special function such as the navigation function.

In the embodiment that has been described, part of the function that is realized by the control section 1 of the image generating apparatus 10 may be realized by the control section 23 of the navigation apparatus 20.

Signals from the shift sensor 81, the vehicle speed sensor 82, and the direction indicator 83 are input into the image generating apparatus 10. However, part or all of the signals may be input into the navigation apparatus 20. In that case, part or all of the signals may be input into the control section 1 of the image generating apparatus 10 through the communication section 42.

In the embodiments that have been described, direction indication intended by the driver is input from the direction instructing device 83. However, the direction indication may be input by other means. For example, movement of a viewpoint of the driver is detected from an image obtained by capturing an image of the driver's eyes. From the detection results, direction indication intended by the driver may be input.

In the embodiments that have been described, a synthetic image is employed as an image showing the side area, in the front/side mode M11. However, a side image obtained from image capturing in the side cameras 52 of the left and right sides or one side of the vehicle may be adopted. However, it is preferable to employ the synthetic image, because it is possible to provide an image of the periphery of the vehicle viewed from a certain virtual viewpoint, and information with high generality.

In the embodiments that have been described, the display modes other than the front side mode M11 display an image showing only the side area. However, the display modes may display an image only showing the front area such as the front image FP1. That is, the display modes other than the front side mode M11 preferably display an image that shows only one of the front area and the side areas to be specified for a certain circumstance.

In the embodiments that have been described, various functions are accomplished by software through calculation processing by the CPU in accordance with programs. However, part of the functions may be accomplished by an electrical hardware circuit. In reverse, part of the functions that are accomplished by a hardware circuit may be accomplished by software.

The present invention is based on Japanese patent applications filed on Jul. 2, 2009 (Japanese Patent Application No. 2009-157368), the disclosures of which are herein incorporated by reference.

DESCRIPTION OF REFERENCE NUMERALS 1 control section
5 image capturing section
9 vehicle
10 image generating apparatus
21 display
32 synthetic image generating section
40 non-volatile memory
43 switching switch

The invention claimed is:

1. An image generating apparatus that generates an image to be displayed on a display apparatus mounted on a vehicle, the image generating apparatus comprising a processor configured to operate as:

an acquiring section that acquires a traveling speed of the vehicle;

a display control section that makes the display apparatus display an image showing the periphery of the vehicle when the traveling speed is lower than a first threshold value; and a mode switching section that switches a display mode for making the display apparatus display the image to one display mode selected from among a plurality of display modes in response to a user operation, the display modes being different from each other, wherein the mode switching section switches the display mode to a specific display mode for making the display apparatus display an image including a first image showing a front area of the vehicle and a second image showing a side area of the vehicle which are juxtaposed to each other at the time the traveling speed drops to below the first threshold value and the display control section starts making the display apparatus display the image, and wherein the display modes except the specific display mode are display modes for making the display apparatus display an image showing only one of the front area of the vehicle and the side area of the vehicle.

2. The image generating apparatus as set forth in claim 1, further comprising a generating section that generates a synthetic image showing the vehicle and the periphery of the vehicle viewed from a virtual viewpoint based on a plurality of images of the periphery of the vehicle captured by a plurality of cameras, wherein the second image is the synthetic image generated by the generating section.

3. An image generating apparatus that generates an image to be displayed on a display apparatus mounted on a vehicle, the image generating apparatus comprising a processor configured to operate as:

an acquiring section that acquires a traveling speed of the vehicle;

a display control section that makes the display apparatus display an image showing the periphery of the vehicle when the traveling speed is lower than a first threshold value;

a mode switching section that switches a display mode for making the display apparatus display the image to one display mode selected from among a plurality of display modes in response to a user operation, the display modes being different from each other;

a generating section that generates a synthetic image showing the vehicle and the periphery of the vehicle viewed from a virtual viewpoint based on a plurality of images of the periphery of the vehicle captured by a plurality of cameras; and an input section that inputs a direction indication of a driver of the vehicle, wherein the mode switching section switches the display mode to a specific display mode for making the display apparatus display an image including a first image showing a front area of the vehicle and a second image showing a side area of the vehicle which are juxtaposed to each other at the time the traveling speed drops to below the first threshold value and the display control section starts making the display apparatus display the image, wherein the second image is the synthetic image generated by the generating section, and wherein the synthetic image shows one side area of the vehicle, which is indicated by the direction indication, displayed larger in size than another side area of the vehicle when the direction indication is input by the input section.

4. The image generating apparatus as set forth in claim 3, wherein the synthetic image shows one side area of the vehicle, which is indicated by the direction indication, displayed larger in size than the another side area of the vehicle when the direction indication is input by the input section from the time the traveling speed drops to below the first threshold value and the display control section starts making the display apparatus display the image.

5. The image generating apparatus as set forth in claim 2, wherein the generating section generates the synthetic image at any time during the image generating apparatus is activated.

6. The image generating apparatus as set forth in claim 2, wherein the generating section generates the synthetic image only when making the display apparatus display the synthetic image.

7. An image generating apparatus that generates an image to be displayed on a display apparatus mounted on a vehicle, the image generating apparatus comprising a processor configured to operate as:

an acquiring section that acquires a traveling speed of the vehicle;

a display control section that makes the display apparatus display an image showing the periphery of the vehicle when the traveling speed is lower than a first threshold value;

a mode switching section that switches a display mode for making the display apparatus display the image to one display mode selected from among a plurality of display modes in response to a user operation, the display modes being different from each other; and a generating section that generates a synthetic image showing the vehicle and the en her of the vehicle viewed from a virtual viewpoint based on a plurality of images of the periphery of the vehicle captured by a plurality of cameras, wherein the mode switching section switches the display mode to a specific display mode for making the display apparatus display an image including a first image showing a front area of the vehicle and a second image showing a side area of the vehicle which are juxtaposed to each other at the time the traveling speed drops to below the first threshold value and the display control section starts making the display apparatus display the image, wherein the second image is the synthetic image generated by the generating section, and wherein the generating section generates the synthetic image when the traveling speed drops to below a second threshold value which is higher than the first threshold value.

8. An image display system to be mounted on a vehicle, the image display system comprising: the image generating apparatus as set forth in claim 1; and a display apparatus that displays an image generated by the image generating apparatus.

9. An image display system to be mounted on a vehicle, the image display system comprising: the image generating apparatus as set forth in claim 3; and a display apparatus that displays an image generated by the image generating apparatus.

10. An image display system to be mounted on a vehicle, the image display system comprising: the image generating apparatus as set forth in claim 7; and a display apparatus that displays an image generated by the image generating apparatus.

* * * * *